(12) United States Patent  (10) Patent No.: US 7,726,266 B2
Komurian et al.  (45) Date of Patent: Jun. 1, 2010

(54) COOLING CIRCUIT FOR AN INTERNAL COMBUSTION ENGINE

(75) Inventors: Richard Komurian, Turckheim (FR); Julien Peuch, Orbey (FR)

(73) Assignee: Mark IV Systemes Moteurs (SAS), Courbevoie (FR)

( * ) Notice: Subject to any disclaimer, the term of this patent is extended or adjusted under 35 U.S.C. 154(b) by 222 days.

(21) Appl. No.: 11/754,014

(22) Filed: May 25, 2007

(65) Prior Publication Data

US 2008/0308049 A1   Dec. 18, 2008

(30) Foreign Application Priority Data

May 26, 2006  (FR) .................................. 06 51925

(51) Int. Cl.
 *F01P 3/02*   (2006.01)
(52) U.S. Cl. .............. 123/41.08; 123/41.29; 123/41.44; 237/12.7; 137/625.46; 137/625.47
(58) Field of Classification Search .............. 123/41.29, 123/41.44, 41.1, 41.08, 41.02, 41.03, 41.06, 123/41.09; 137/625.32, 625.46, 625.47
 See application file for complete search history.

(56) References Cited

U.S. PATENT DOCUMENTS

| | | | | |
|---|---|---|---|---|
| 5,893,392 | A * | 4/1999 | Spies et al. ............ | 137/625.47 |
| 6,164,248 | A * | 12/2000 | Lehmann .................... | 123/41.1 |
| 6,539,899 | B1 | 4/2003 | Piccirilli et al. | |
| 7,163,194 | B2 * | 1/2007 | Pervaiz ........................ | 251/288 |
| 7,168,397 | B2 * | 1/2007 | Chanfreau et al. ........ | 123/41.01 |
| 2003/0098077 | A1 | 5/2003 | McLane et al. | |
| 2004/0173167 | A1 * | 9/2004 | Chanfreau et al. ......... | 123/41.1 |
| 2006/0070672 | A1 * | 4/2006 | Martins et al. ......... | 137/625.47 |

FOREIGN PATENT DOCUMENTS

| | | |
|---|---|---|
| EP | 1505323 | 2/2005 |
| FR | 2800125 | 4/2001 |
| FR | 2827359 | 1/2003 |

OTHER PUBLICATIONS

Preliminary Search Report dated Feb. 14, 2007 corresponding to Application No. FR 0651925; Applicant, Mark IV Systems Moteurs (SAS).

* cited by examiner

*Primary Examiner*—Michael Cuff
*Assistant Examiner*—Hung Q Nguyen
(74) *Attorney, Agent, or Firm*—Sheridan Ross PC

(57) ABSTRACT

A cooling circuit comprises a cylinder block and a cylinder head block, these blocks each including cooling elements the form of integrated portions of circuit. The cooling circuit also includes at least a first, a second and a third separate external loops for external recirculation or reinjection mounted in parallel and looped on the integrated cooling elements. A circulating pump is connected fluidically to the integrated cooling element and to the three recirculation loops causing the fluid to circulate in the integrated cooling element and in the three recirculation loops. The at least three recirculation loops offer at least one common fluid node and are at least partially overlapping. A single actuator controls the flow of liquid circulating in the at least three recirculation loops.

13 Claims, 10 Drawing Sheets

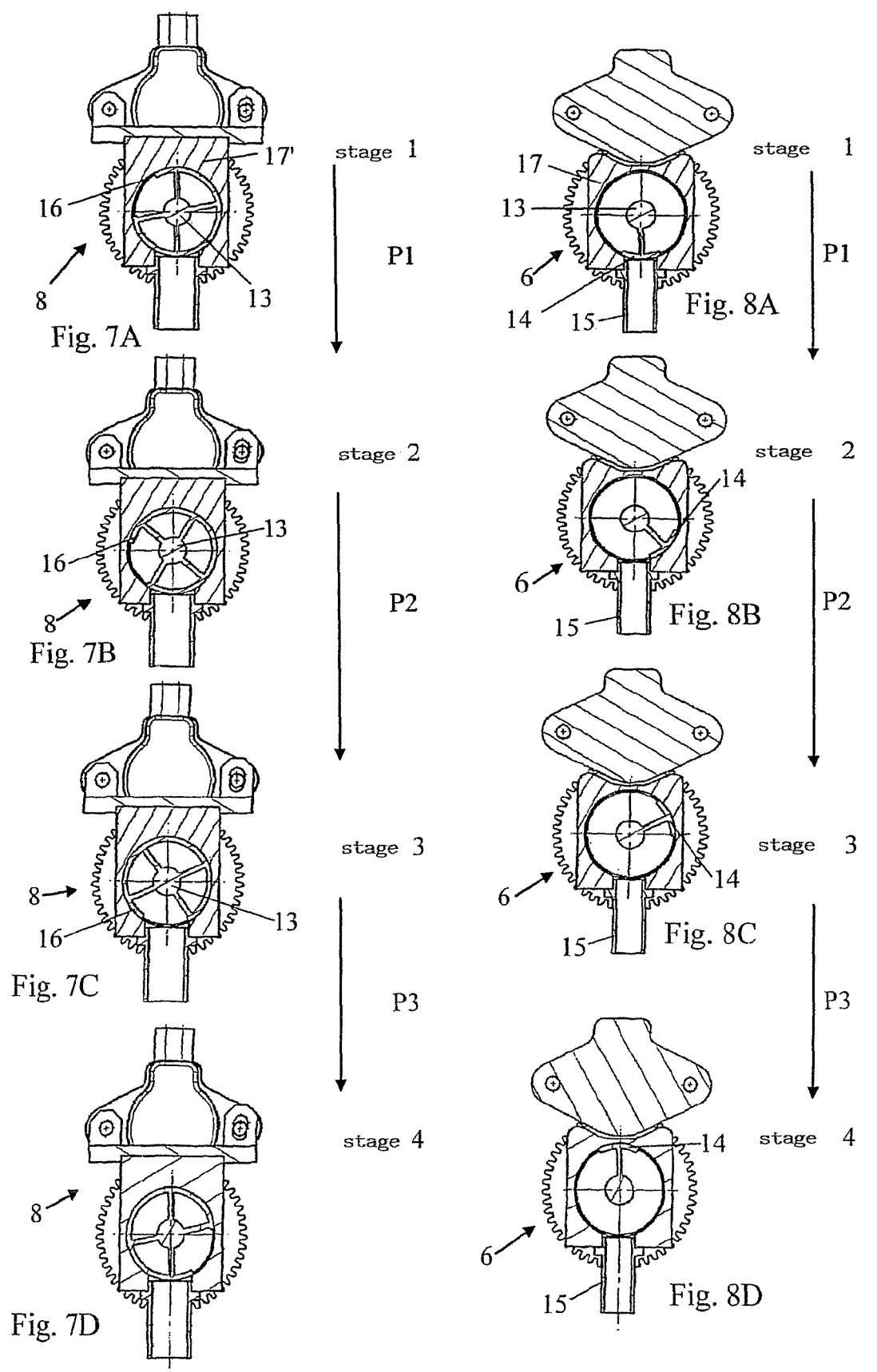

COOLING CIRCUIT FOR AN INTERNAL COMBUSTION ENGINE

The present invention relates to the field of equipment for motor vehicles, more specifically engine cooling for these, and its subject is a cooling circuit for such an engine equipped with improved regulation of the flow of liquid in several recirculation loops, preferably by means of a single actuator and over several stages of operation.

The invention will advantageously be applied as part of a cooling circuit in an internal combustion engine of the type which essentially includes a cylinder block and a cylinder head block, these blocks each including cooling means in the form of portions of circuit integrated in their structure.

BACKGROUND OF THE INVENTION

Such a cooling circuit generally includes, in addition to the said integrated portions of cooling circuit, on the one hand, at least a first, a second and a third separate external loops for external recirculation or reinjection mounted in parallel and looped on the said integrated cooling means and, on the other hand, a circulating pump, connected fluidically to the integrated cooling means and to the three recirculation loops, causing the fluid to circulate in the said integrated cooling means and the said three recirculation loops. Each of the said loops includes a regulating component which regulates the flow of liquid circulating in the said loops.

The known circuits of the type referred to regulate temperature and require, for regulation of the fluid in each loop, multi-channel regulating components of complex structure which require multiple, elaborate control circuits, increasing the cost price, and have limited robustness, safety and reliability of operation.

SUMMARY OF THE INVENTION

The object of the present invention is to alleviate these disadvantages. To this end, its subject-matter is a cooling circuit for an internal combustion engine including essentially a cylinder block and cylinder head block, these blocks each including cooling means in the form of integrated portions of circuit, the said cooling circuit also including, on the one hand, at least a first, a second and a third separate external loops for external recirculation or reinjection mounted in parallel and looped on the said integrated cooling means, and, on the other hand, a circulating pump connected fluidically to the integrated cooling means and to the three recirculation loops, causing the fluid to circulate in the said integrated cooling means and in the said three recirculation loops.

The circuit is characterised in that the said at least three recirculation loops offer at least one common fluid node and are at least partially overlapping and in that a single actuator controls the flow of liquid circulating in the said at least three recirculation loops.

BRIEF DESCRIPTION OF THE DRAWINGS

The invention will be better understood through the description which follows, which relates to two preferred modes of embodiment, given as non-exhaustive examples and explained with reference to the attached schematic drawings, in which:

FIGS. 7A to 7D are partial views in section of the second regulating component according to a second mode of embodiment of the latter, the said second component being represented in four different states in relation to the four stages 1 to 4 and the three phases P1, P2 and P3 marked on FIG. 5;

FIGS. 8A to 8D are partial views in section of the first regulating component according to a mode of embodiment of the latter, the said first component being represented in four different states in relation to the four stages 1 to 4 and the three phases P1, P2 and P3 marked on FIG. 5;

DETAILED DESCRIPTION OF THE INVENTION

Figure 1:
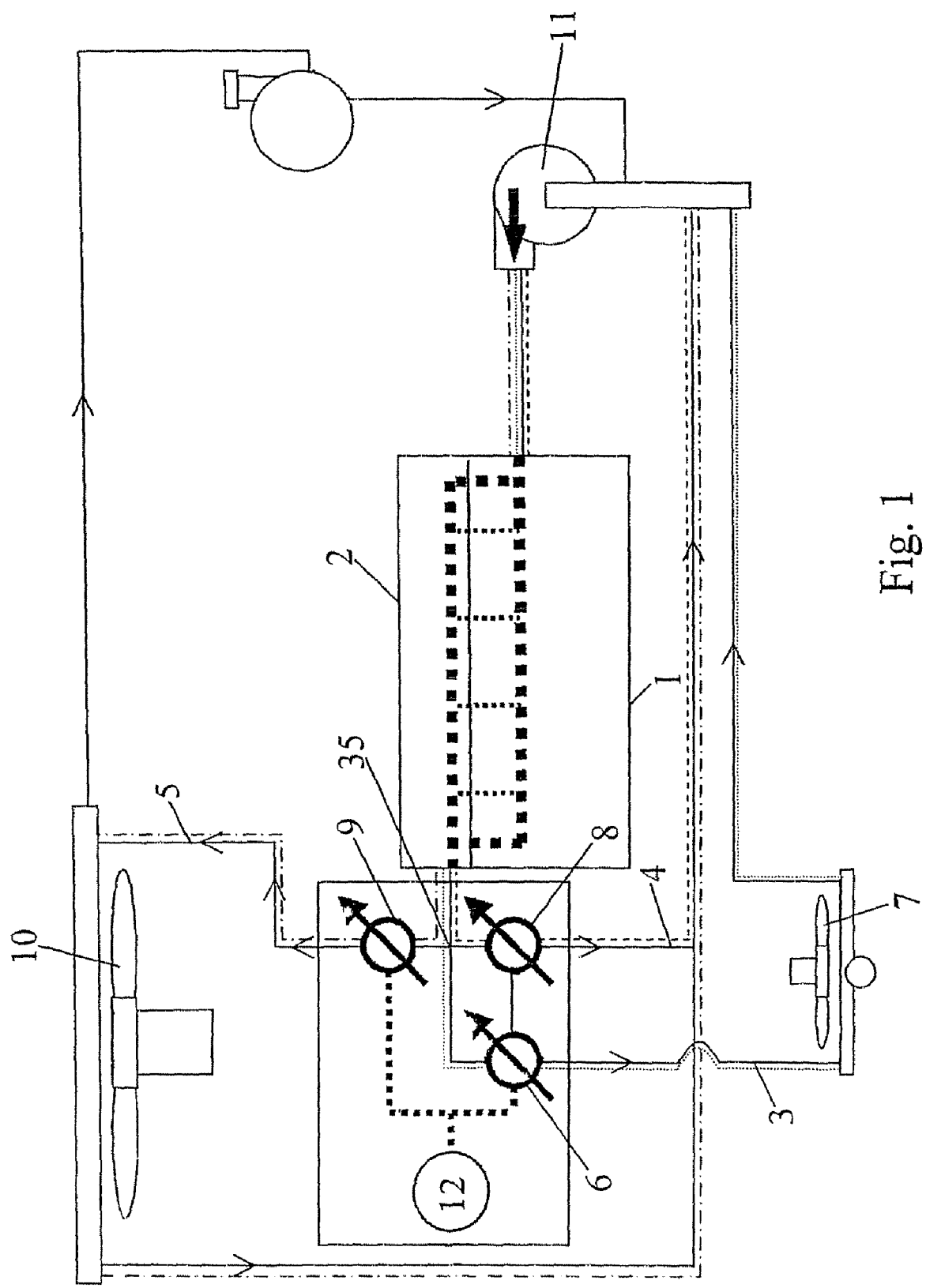
FIG. 1 is a fluid diagram of a cooling circuit with multiple loops according to the invention.

FIG. 1 represents a cooling circuit in an internal combustion engine including essentially a cylinder block 1 and a cylinder head block 2, these blocks each including cooling means in the form of integrated portions of the circuit (in their respective structures).

This cooling circuit also includes, on the one hand, at least a first 3, a second 4 and a third 5 separate external loops for external recirculation or reinjection mounted in parallel and looped on the said integrated cooling means and, on the other hand, a circulating pump 11 connected fluidically to the integrated cooling means and to the three recirculation loops 3, 4 and 5, causing the fluid to circulate in the said integrated cooling means and in the said three recirculation loops 3, 4 and 5.

According to the invention, the said at least three recirculation loops 3, 4 and 5 offer at least one common fluid node 35 and are at least partially overlapping and a single actuator 12 which controls the flow of liquid circulating in the said at least three recirculation loops 3, 4 and 5.

Characteristically, and according to a variation of the invention represented in the attached figures, the first loop 3 may incorporate a first component 6 regulating the flow of liquid circulating in this first loop 3, the second loop 4 may incorporate a second component 8 regulating the flow of liquid circulating in this second loop 4, the third loop 5 may incorporate a third component 9 regulating the flow of liquid circulating in this third loop 5, and the single actuator 12 may control the three components 6, 8 and 9 regulating the flow of liquid circulating in the said at least three recirculation loops 3, 4 and 5.

Each recirculation loop may therefore have its own regulation while still being controlled by a common single actuator 12.

According to a variation (not represented), the first loop 3 and the second loop 4 may incorporate a common component regulating the flow of liquid circulating in each of the said first loop 3 and second loop 4, the third loop 5 may incorporate a second component regulating the flow of liquid circulating in this third loop 5, and the single actuator 12 may control the common component and the second component regulating the flow of liquid circulating in the said at least three recirculation loops 3, 4 and 5.

In the attached figures, the inlet of the recirculating pump 11 is connected to the outlets of the at least three recirculation loops 3, 4 and 5, its outlet is connected to the inlet or inlets of the integrated recirculation means, and the common fluid node 35 is located close to, and connected to, the outlet or outlets of the integrated recirculation means. However, it is also possible to make the cooling circuit according to the invention with the inlet of the recirculating pump 11 connected to the outlet or outlets of the integrated recirculation means and the outlet of the said recirculation pump 11 connected to the common fluid node 35.

According to the invention, the simultaneous, multi-channel and at least partially interdependent regulation supplied by the single actuator 12 may give rise, over the extent of the range of control of the latter, to three distinct, associated phases of regulation and circulation in the said loops 4, 5 and 6, namely, respectively a first phase P1 in which the value of the flow rate of the liquid in the first loop 3 is progressively increased from a nil value to a maximum value, and the flow rate of the liquid in the second 4 and third 5 loops is nil, a second phase P2 in which the value of the flow rate of the liquid in the first loop 3 is, and remains, maximum, the value of the flow rate of the liquid in the second loop 4 is progressively increased from a nil value to a maximum value and the flow rate of the liquid in the third loop 5 is nil, and a third phase P3 in which the value of the flow rate of the liquid in the first loop 3 always remains at maximum, the value of the flow rate of the liquid in the second loop 4 is progressively decreased to a nil value and the value of the flow rate of the liquid in the third loop 9 passes progressively from a nil value to a maximum value, the beginnings of the second P2 and third P3 phases corresponding respectively to a maximum value being reached, in the first circulation loop 3 and in the second circulation loop 4, for the flow rate of the liquid.

So, in the case where each loop 3, 4 and 5 includes a regulating component 6, 8 and 9, the first phase P1 may correspond to a phase in which the first regulating component 6 opens progressively and the second 8 and third 9 regulating components remain in their closed state, the second phase P2 may correspond to a phase in which the first regulating component 6 is, and remains, in its state of maximum opening, the second regulating component 8 opens progressively until it reaches its state of maximum opening and the third regulating component 9 remains in its closed state, and the third phase P3 may correspond to a phase in which the first regulating component 6 always remains in its state of maximum opening, the second regulating component 8 progressively re-closes until it reaches its closed state and the third regulating component 9 opens progressively until it reaches its state of maximum opening. In addition, the beginnings of the second P2 and third P3 phases then correspond respectively to the arrival, by the first regulating component 6 and the second regulating component 8, at their state of maximum opening (see FIG. 5 in relation to FIGS. 7A to 7D and 8A to 8D).

Figure 5:
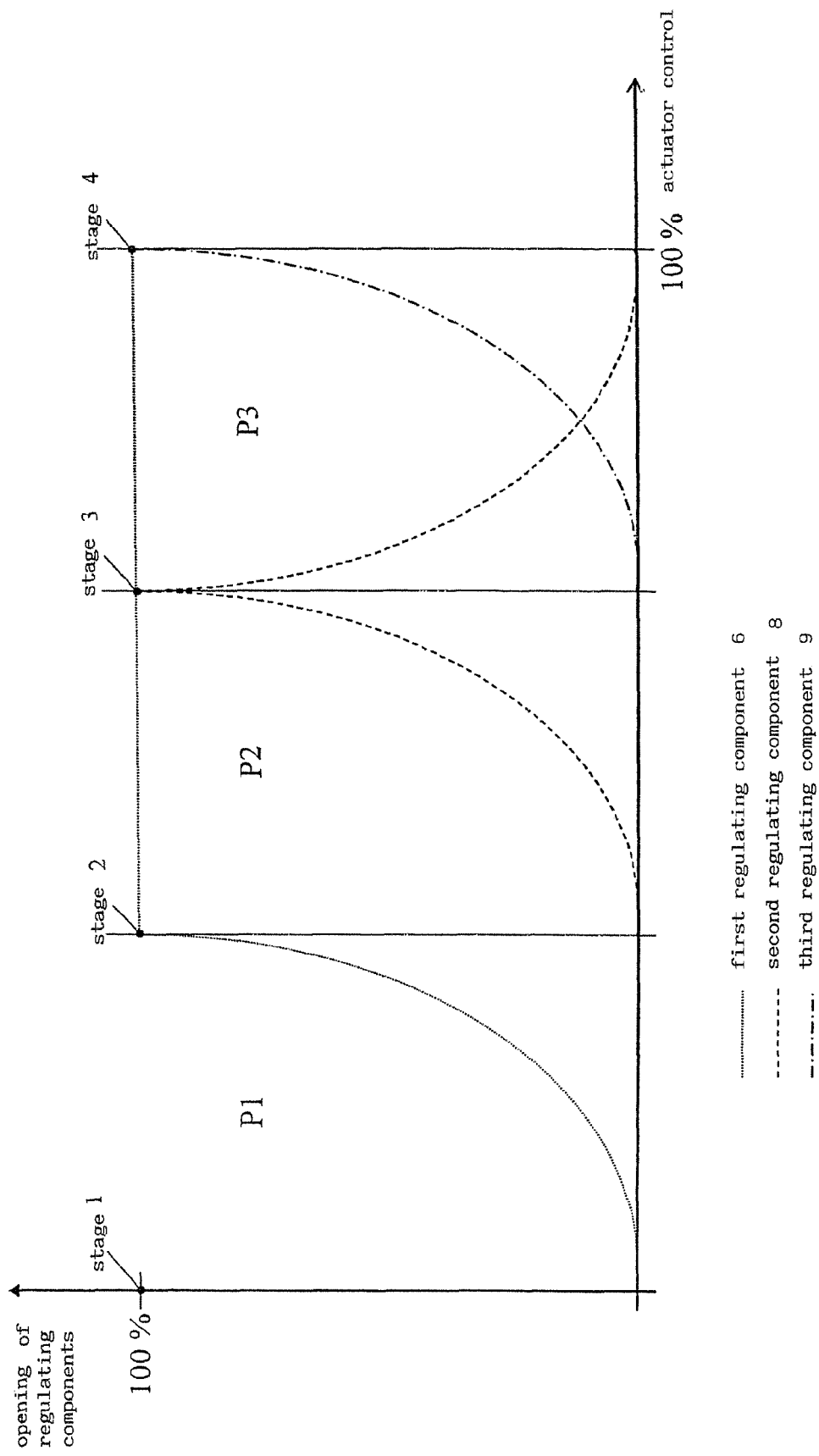
FIG. 5 is a graphical representation of the opening of the regulating components according to the separate phases of regulation and circulation over the whole control range of the actuator according to the present invention.

In FIG. 5 the abscissa represents the range of operation controlled by the single actuator 12 and the ordinate represents the degree of opening of the three regulating components 6, 8 and 9. So, with regard to the abscissae, a complete range of operation corresponds to 100% and, with regard to the ordinates, total or maximum opening of a regulating component corresponds to 100% and total closure corresponds to 0%.

It can be seen that in phase P3, the second 8 and third 9 regulating components make opposite or inverse regulations, that is, when the second component 8 is progressively closing to its closed state, the third component 9 is progressively opening to its state of maximum opening, while the first regulating component 6 remains in its position of maximum opening.

According to the invention, the single actuator 12 may control as it rotates an actuating shaft 13 to which are functionally or operationally connected the three regulating components 6, 8 and 9. Moreover, the first 6 and second 8 regulating components may be mounted directly on the said actuating shaft 13 (being firmly interlocked with it in rotation with the said shaft) and the third component 9 may be actuated by an intermediate means of actuation connected kinematically to the said actuating shaft 13.

Because of this, the single actuator 12 controls, directly or indirectly, by means of the actuating shaft 13, the three regulating components 6, 8 and 9. The intermediate means of actuation will be described later in the description.

Figure 2:
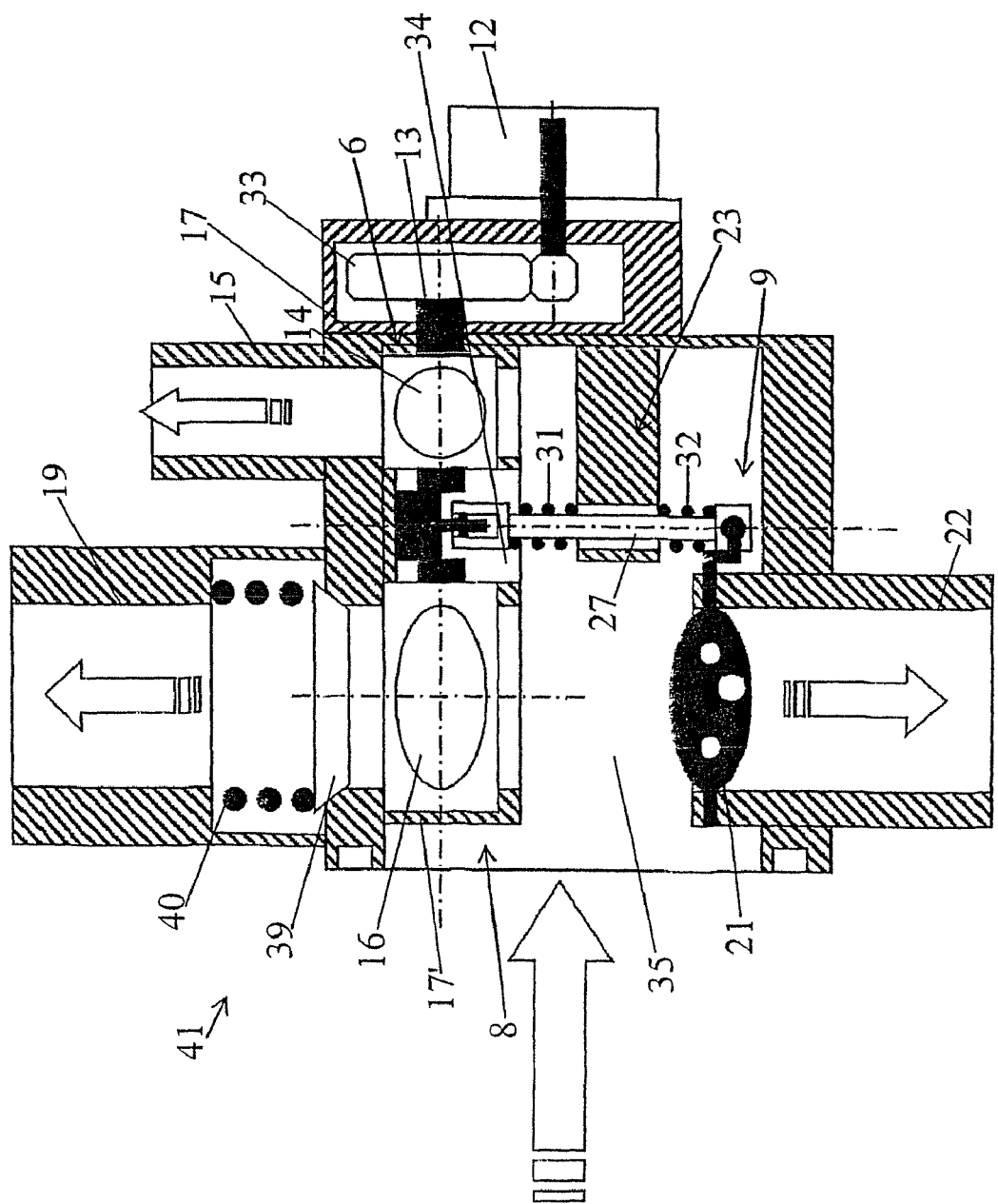
FIG. 2 is a schematic representation in section of a structural unit in which are incorporated the regulating components of the cooling circuit with multiple loops according to a first mode of embodiment of the present invention.
Figure 6:
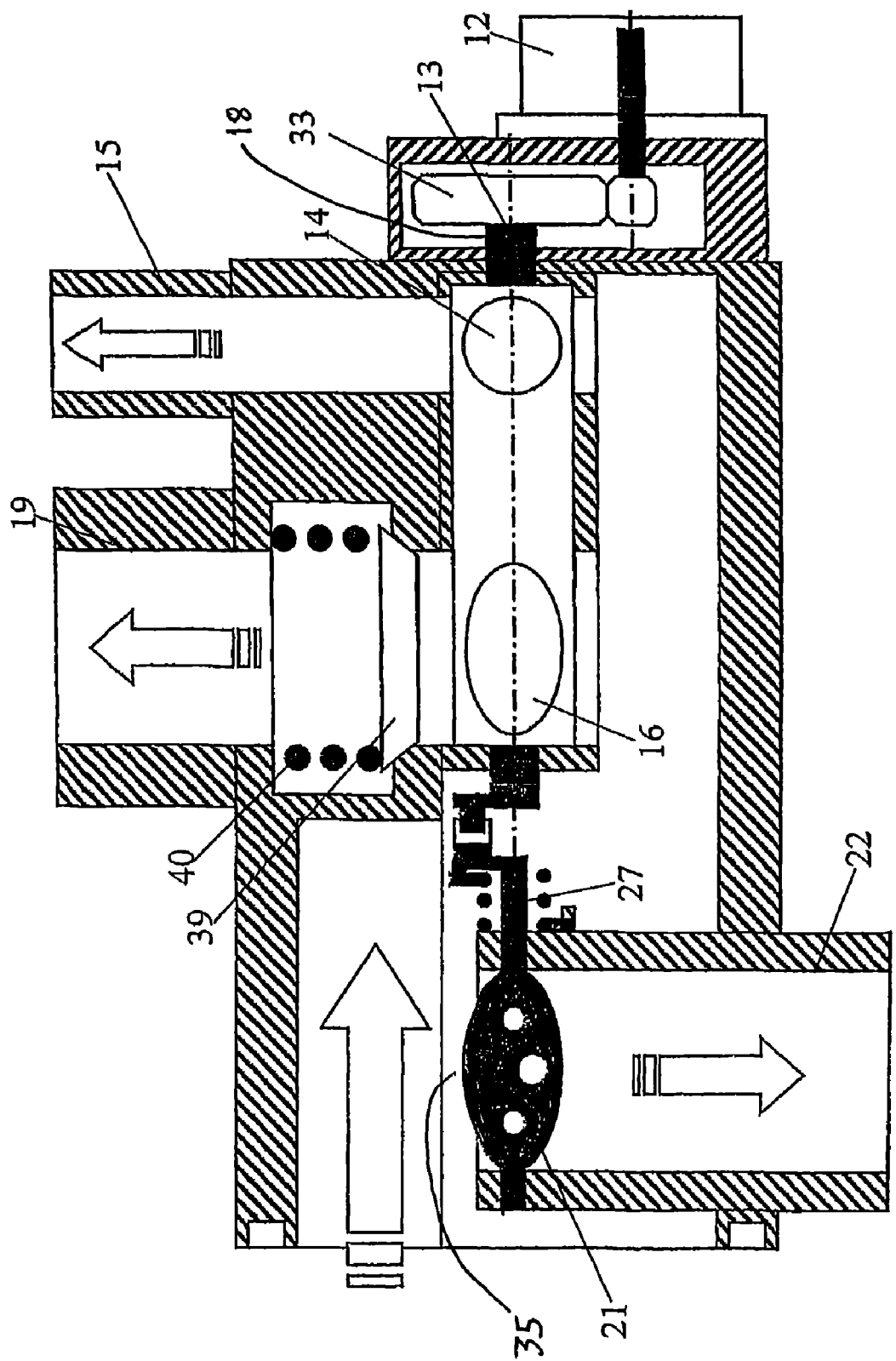
FIG. 6 is a schematic representation in section of a structural unit in which are incorporated the regulating components of the cooling circuit with multiple loops according to a second mode of embodiment of the present invention.
Figure 9B:
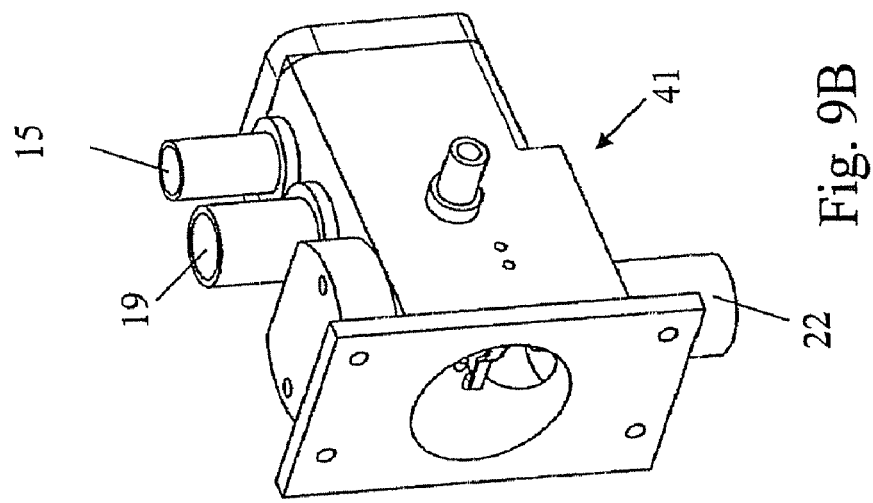
FIGS. 9A and 9B are perspective views according to two different directions of a practical embodiment of a structural unit (three-way valve) incorporating the three components of embodiment according to the invention, equipped (FIG. 9A) or not equipped (FIG. 9B) with means of actuating and controlling the said components.
Figure 9A:
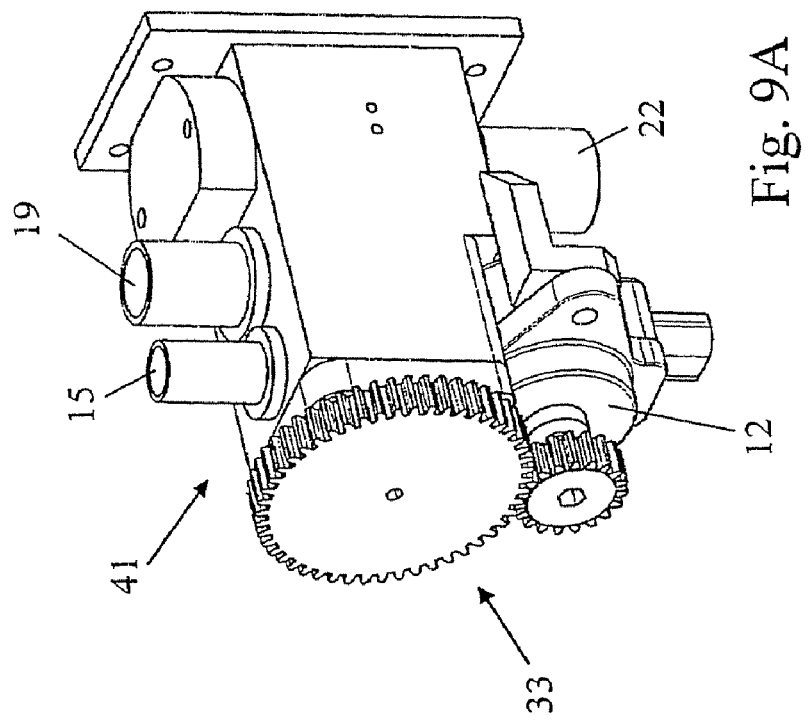
Figure 10:
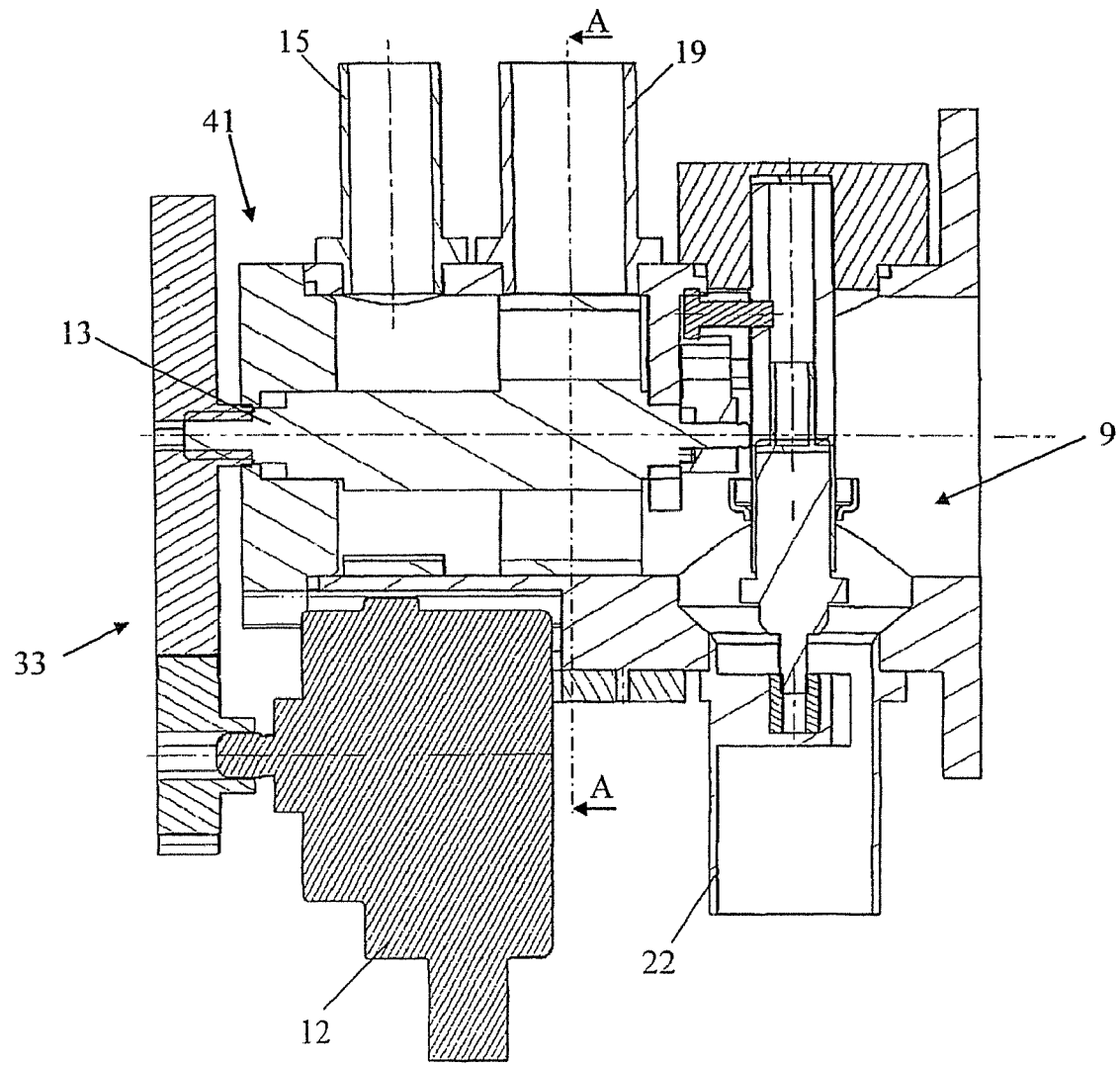
FIG. 10 is a section view, through a plane containing the actuator shaft carrying the first and second regulating components, of the unit in the form of a three-way valve represented in FIG. 9A.
Figure 11:
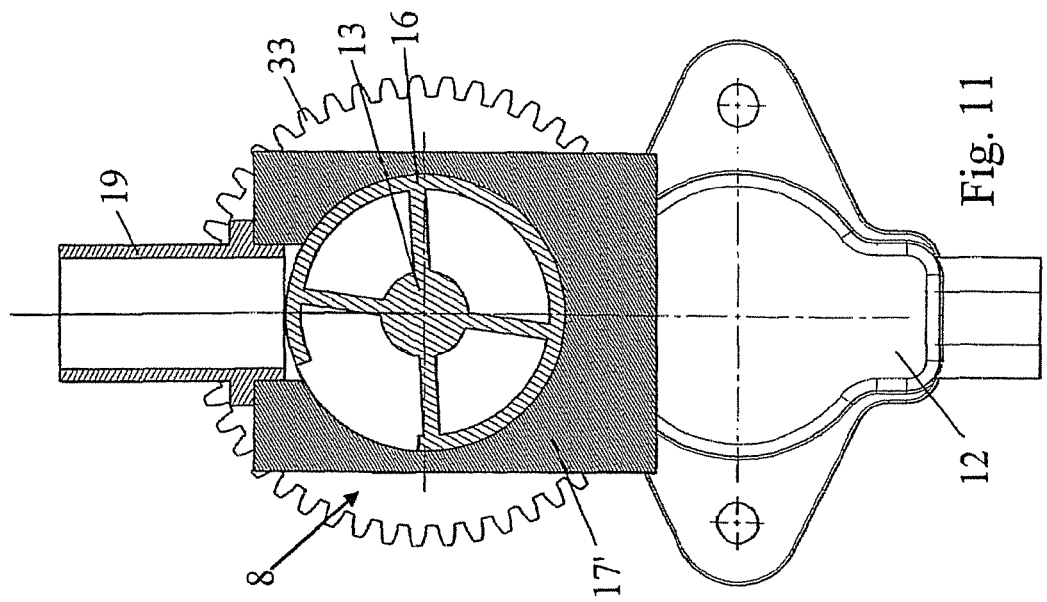
FIG. 11 is a section view A-A of the unit represented in FIG. 10.
Figure 12:
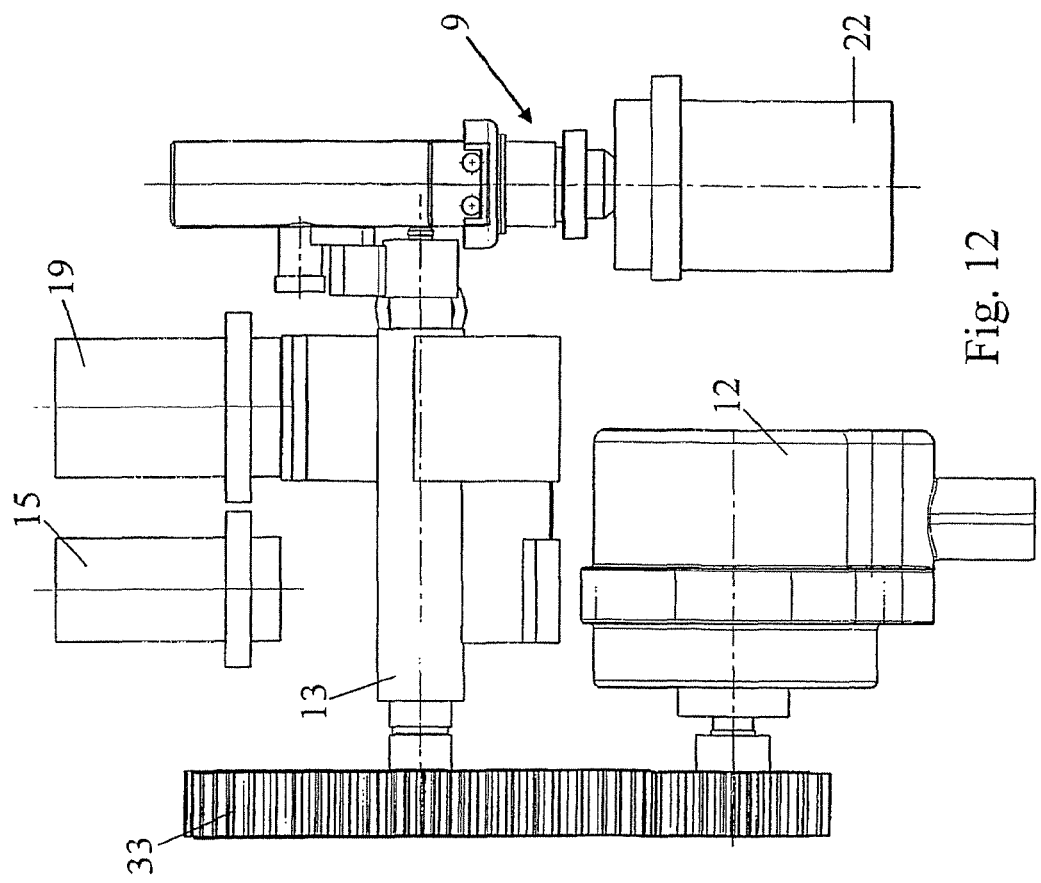
FIG. 12 is a transparent diagram of the structural unit in FIGS. 9A and 10, the body of the structural unit not being visible.

In addition, the drive shaft 13 may be driven directly or indirectly by the single actuator 12. FIGS. 2 and 6 represent, for the purposes of example, two modes of embodiment of the invention in which the driving is not direct, the single actuator 12 transmitting its rotating movement by means of a transmission mechanism 33 of the type with gears (with a first gearwheel integral with the shaft 13 and a second gearwheel integral with the axis of the actuator 12 and engaging with the first gear wheel). The rotation movement from the single actuator 12 may therefore be geared down, for example.

The range of functioning of the single actuator 12 thus corresponds to the rotation, through a pre-defined angle, of the actuating shaft 13. The full range of functioning may, of course, not correspond to a complete rotation of the said actuating shaft 13, i.e. a rotation through an angle of 360 degrees.

Characteristically, and as illustrated in the fluid diagram in FIG. 1, at least one fan convector 7 or similar heat exchanger may be mounted in series in the first recirculation loop 3. This fan convector 7 may correspond to an exchanger which forms part of an interior heating circuit in the vehicle concerned.

The second recirculation loop 4 may consist of a branch loop, and at least one secondary fan convector 10, different from the fan convector 7 in the first loop 3, for example a radiator, may be mounted in series in the third recirculation loop 5.

So the first recirculation loop 3 which, as shown in FIG. 5, is the only loop supplied during the three phases P1, P2 and P3, may be used for heating the vehicle's passenger compartment.

The second loop 4 is a branch loop through which the liquid starts to pass during the transitional phase P2 until the corresponding regulating component 8 is fully open, and which is no longer traversed by the liquid at the end of regulation phase P3 corresponding to closure of the said regulating component 8.

The third loop 5 may offer a radiator and the liquid only passes through this third loop during phase P3 corresponding to the regulation phase.

The three regulating components 6, 8 and 9 may be incorporated into the same structural unit 41 (3-way valve unit) to which are fluidically connected pipelines 15, 19 and 22 forming portions at least of recirculation loops 3, 4 and 5, the said structural unit 41 also incorporating the said at least one common fluid node 35. Such an arrangement, which makes it possible to limit the space requirement under the bonnet of a vehicle, is represented in FIGS. 2 and 6.

The first regulating component 6 may be located between the said at least one common fluid node 35 and the pipeline 15 forming the first recirculation loop 3, the second regulating component 8 may be located between the said at least one common fluid node 35 and the pipeline 19 forming the second recirculation loop 4, the third regulating component 9 may be located between the said at least one common fluid node 35 and the pipeline 22 forming the third recirculation loop 5 and the first 6 and second 8 regulating components may also be connected to each other by a portion of pipeline 34.

Advantageously (FIGS. 2, 6 and 8A to 8D), the first regulating component 6 may be made in the form of a portion of cylindrical wall 14 mounted firmly so that it rotates on the actuating shaft 13, in a hollow housing 17, the said hollow housing 17 forming a port 18 taking the liquid to the pipeline 15 of equal section to that of pipeline 15, and aligned with the latter, the said portion of cylindrical wall 14 being mounted transversely in the said port 18 and able to rotate, and its dimensions being at least sufficient to block off the port 18 in a closed position. The walls of the hollow housing 17 located on either side of the actuating shaft 13, perpendicular to the longitudinal axis of the port 18, may offer a recess 20 receiving the portion of cylindrical wall 14 in retracted position in which the said portion of cylindrical wall 14 is located outside the flow area of the port 18, so that the portion of cylindrical wall 14 moves from a closed position to an open position during the first phase P1 then remains in this last position during the second P2 and third P3 phases, the open position corresponding to the retracted position.

Figure 3A:
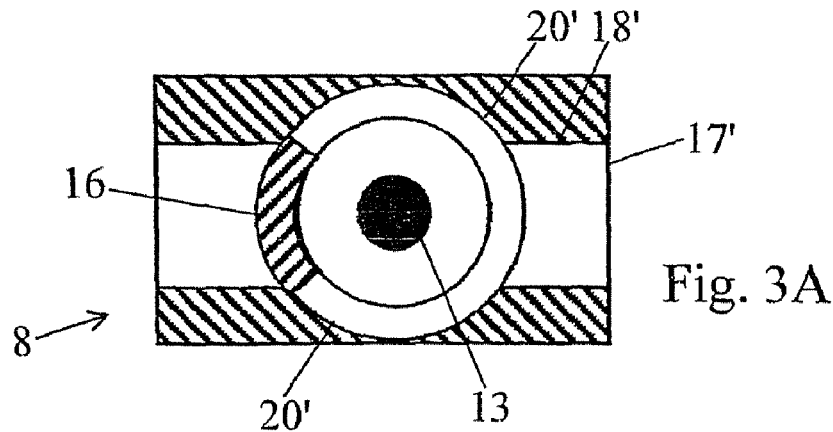
FIGS. 3A to 3C are schematic representations in section of a first mode of embodiment of the second regulating component of the present invention during the different phases of regulation and circulation.
Figure 3B:
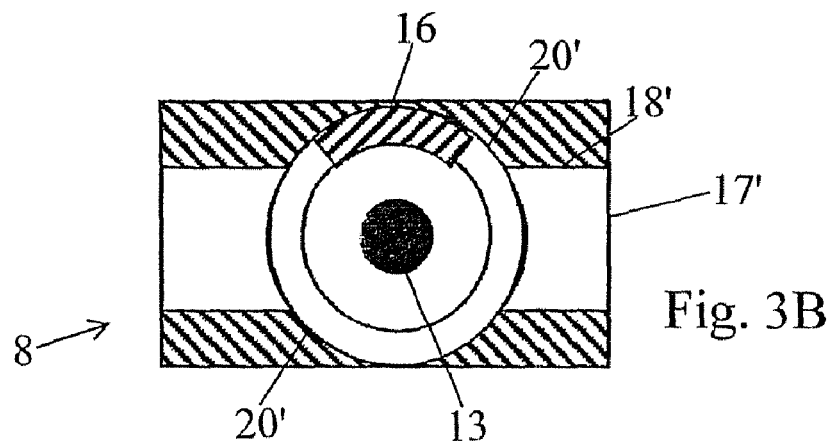
Figure 3C:
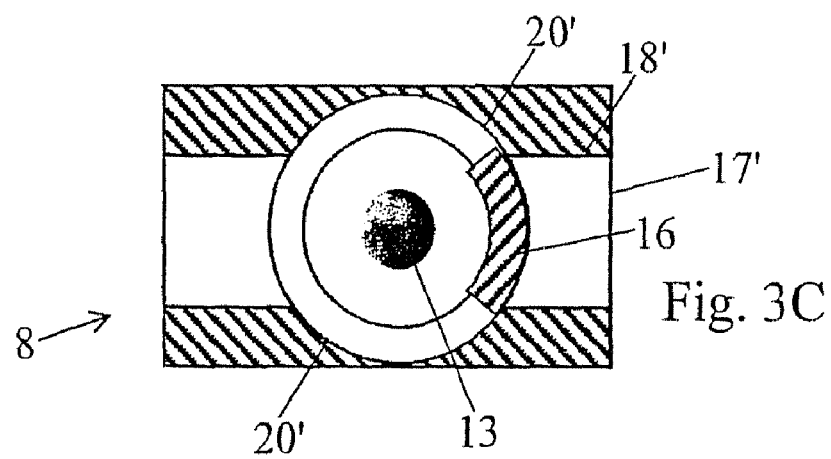

FIGS. 3A to 3C represent schematically, in relation to a first mode of embodiment of the second regulating component 8, the latter in the positions corresponding respectively to the three phases P1, P2 and P3 of regulation and circulation. The said second regulating component 8 may be made in the form of a portion of cylindrical wall 16 mounted firmly so that it rotates on the actuating shaft 13, in a hollow housing 17', the said hollow housing 17' forming a port 18' taking the liquid to the pipeline 19 of equal section to the section of the pipeline 19, and aligned with the latter, the said portion of cylindrical wall 16 being mounted transversely in the said port 18' and able to rotate.

The dimensions of the said portion of cylindrical wall 16 are preferably at least sufficient to block off the port 18' in a closed position.

Moreover, the walls of the hollow housing 17' located either side of the actuating shaft 13, perpendicular to the longitudinal axis of the port 18', may offer a recess 20' receiving the portion of cylindrical wall 16 in retracted position in which the said portion of cylindrical wall 16 is located outside the flow area of the port 18'.

These recesses 20' make it possible for the portion of cylindrical wall 16 to move into the retracted position represented in FIG. 3B and corresponding to total opening of the third regulating component 9 enabling the liquid to pass through the pipeline 19.

The configuration is such that the portion of cylindrical wall 16 may be in closed position, in which the portion of cylindrical wall 16 closes the port 18' (see FIGS. 3A and 3C), during the first phase P1, then move from this closed position to an open position during the second phase P2 and return to closed position during the third phase P3, the open position corresponding to the retracted position.

FIGS. 7A to 7D represent another variation of the second component 8 in different positions in relation to the corresponding curve in FIG. 5.

The liquid circulating in the third recirculation loop 5 is regulated by the third regulating component 9 which may be made in the form of a valve 21 mounted so that it pivots around an axis perpendicular to the longitudinal axis of the pipeline 22 and connected to the actuating shaft 13 by means of a device for transmission and transformation 23 of the rotating movement of the said actuating shaft 13, forming the intermediate actuating means.

In effect, as stated earlier, the third component 9 is actuated indirectly by the said actuating shaft 13, by means of the device for transmission and transformation 23 of the rotating movement of the actuating shaft 13 which may consist, according to the invention, of a cam 24 mounted firmly so that it rotates on the actuating shaft 13 and made in the form of a portion of disk offering a running surface 25 for a roller 26 fixed so that it rotates on a first extremity of a rod 27 forming a cam follower the other extremity of which offers a receiving groove 28, perpendicular to the longitudinal axis of the pipeline 22, to receive a first extremity of a bar 28 the other extremity of which is connected to the swivel pin of the valve 21, the said rod 27 being guided parallel to the longitudinal axis of the pipeline 22 in a corresponding groove 29 made in a projecting part 30 of the structural unit 41 so that the rotation of the cam 24 results in movement of the roller 26 along the running surface 25 of the said cam 24, the movement of the rod 27 parallel to the longitudinal axis of the pipeline 22, the movement of the extremity of the bar 28 in the groove 28, perpendicular to the longitudinal axis of the pipeline 22, and the pivoting of the valve 21 around its axis 21' to open or close the pipeline 22.

Figure 4:
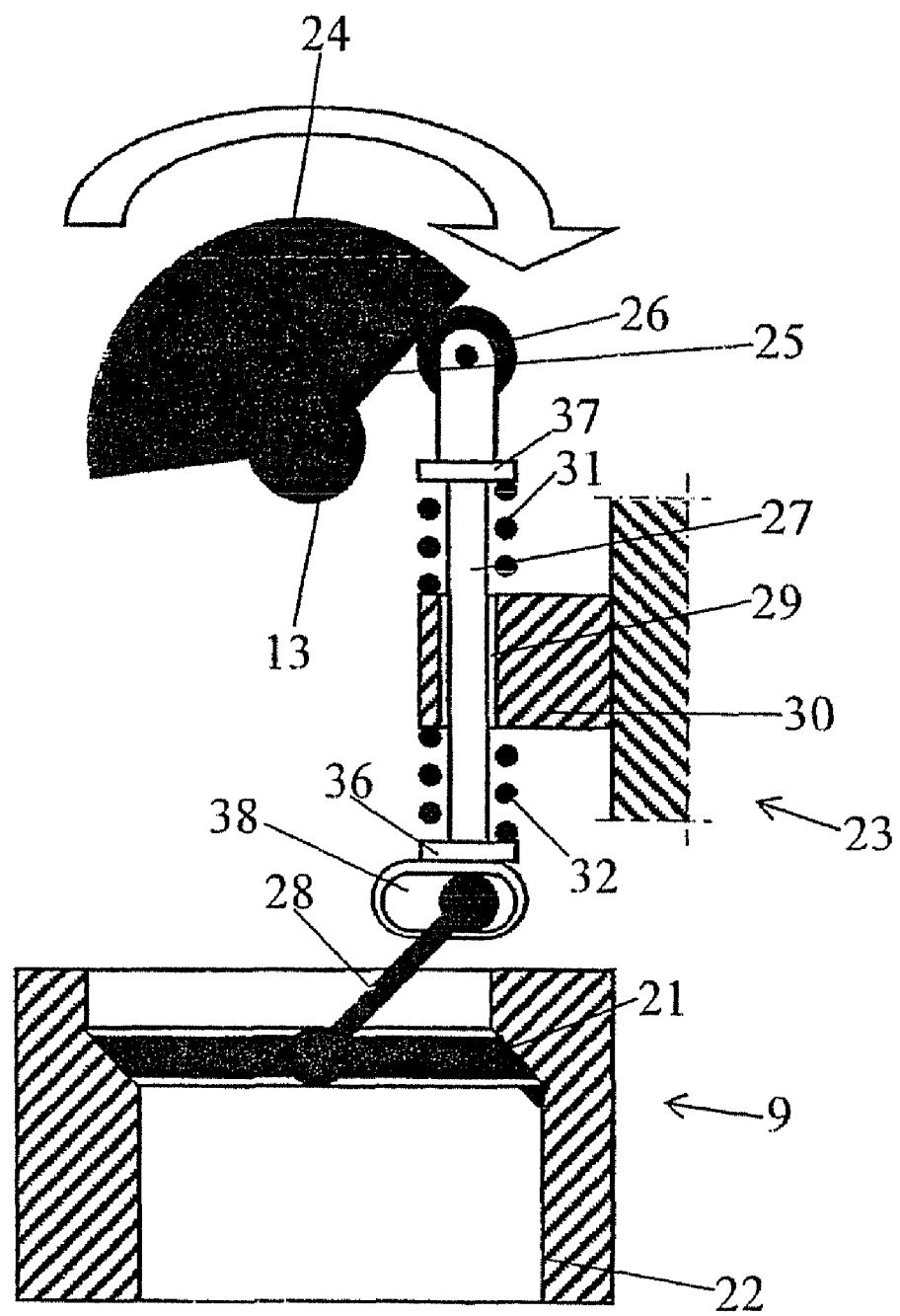
FIG. 4 is a schematic representation in section of the third regulating component according to the present invention.

In FIG. 4 representing the third regulating component 9 in the form of a valve 21, the latter is in closed state and therefore prevents passage of the liquid in pipeline 22 forming the third recirculation loop 5 and in which the radiator may be incorporated.

When a fault appears, preventing, for example, the opening of the regulating components 6, 8 and 9 by the actuating shaft 13, the liquid can no longer circulate in any loop, so that engine cooling is impossible. To avoid this situation, the invention specifies that the cooling circuit may offer a safety means 32 directly influenced by the temperature of the liquid circulating in the structural unit 41 and forcing opening of the component 9 regulating the liquid circulating in the third recirculation loop 5.

Characteristically, the safety means 32 may be a compression spring located between a spring stop 36 made on the rod 27 on the side of the receiving groove 38 and the portion of wall corresponding to the projecting wall 30, cooperating with a second compression spring 31 located between a stop 37 made on the rod 27 on the side opposite the stop 36 in relation to the projecting part 30 and the portion of wall corresponding to the projecting part 30. The said compression spring 32 forming safety means may be made of a shape memory material of which the elasticity constant increases according to the temperature.

So the compression spring forming safety means 32, because it is immersed in the liquid travelling through the structural unit 41, is influenced directly by the temperature of the latter, so that an increase in the said temperature results in an increase in the elasticity constant of the material comprising the compression spring 32. The load on the compression spring 32 consequently increases, resulting in movement of the rod 27 in the groove 29 and therefore that of the receiving groove 38, against the force of the compression spring 31, so that the bar 28 connected to the valve 21 moves, thus leading to opening of the said valve 21. This opening then makes possible passage of the liquid in recirculation loop 3 in which a radiator may be mounted, and overheating of the engine is therefore avoided. The compression spring forming safety means 32 then makes it possible to establish a safety open position if the single actuator does not function correctly, for example and the temperature of the liquid increases.

Characteristically, the compression spring forming safety means 32 may be composed of two metals.

FIG. 2 represents the structural unit 41 according to a first mode of embodiment of the invention. In this mode, the device 23 for transmission and transformation of the rotating movement of the actuating shaft 13 is connected to the actuating shaft 13 between the first 6 and second 8 actuation components. In effect, the cam 24 is mounted on the actuating shaft 13 between the valve 14 and the portion of cylindrical wall 16 and the rod 27 is placed perpendicular to the said actuating shaft 13, so that the second 8 and third 9 regulating components face each other in the structural unit 41.

In the second mode of embodiment represented in FIG. 6, the device for transmission and transformation 23 of the rotating movement of the actuating shaft 13 is placed upstream of the first 6 and second 8 actuation components in the direction of entry of the liquid into the structural unit 41. The cam 24 is placed on the extremity of the actuating shaft 13 and the rod 27 is placed parallel to the said shaft, as a continuation of it.

In the two modes of embodiment represented, a valve 39 which can move along the longitudinal axis of the pipeline 19 forming the second recirculation loop 4 is mounted in the said pipeline 19 downstream of the portion of cylindrical wall 16. This valve 39 has a load applied to it by a compression spring 40 and constitutes a pressure valve which opens only when the liquid exerts sufficient pressure on the said valve 39, i.e. a pressure which enables compression of the said compression spring 40. This valve 39 therefore makes it possible to make a finer adjustment of the flow of liquid in the second recirculation loop 4 which may be a branch loop.

Of course, the invention is not limited to the modes of embodiment described and represented in the attached drawings. Modifications are possible, particularly from the point of view of the composition of the different elements or by substituting equivalent techniques, without in any way going outside the scope of the invention.

The invention claimed is:

1. A cooling circuit for an internal combustion engine including a cylinder block and a cylinder head block, these blocks each including integrated cooling means in a form of integrated portions of circuit, the cooling circuit also including, at least a first, a second and a third separate recirculation loops for external recirculation or reinjection mounted in parallel and looped on said integrated cooling means and, a circulating pump connected fluidically to the integrated cooling means and to the three recirculation loops, causing a liquid to circulate in said integrated cooling means and in said three recirculation loops;

wherein said at least three recirculation loops offer at least one common fluid node and wherein a single actuator controls the flow of liquid circulating in said at least three recirculation loops;

wherein three regulating components are incorporated into a same structural unit to which are fluidically connected to form portions of said at least three recirculation loops, said structural unit also incorporating said at least one common fluid node, wherein a first regulating component of said three regulating components is placed between said at least one common fluid node and a first pipeline forming the first recirculation loop, a second regulating component of said three regulating components is placed between said at least one common fluid node and a second pipeline forming the second recirculation loop, a third regulating component of said three regulating components is placed between said at least one common fluid node and a third pipeline forming the third recirculation loop, and the first and second regulating components are also connected to each other by a portion of a fourth pipeline wherein the third regulating component is made in the form of a valve mounted so that it pivots around an axis perpendicular to a longitudinal axis of the third pipeline and said valve connected to an actuating shaft by a device for transmission and transformation of the rotating movement of said actuating shaft.

2. The cooling circuit according to claim 1, wherein the first loop incorporates the first regulating component regulating the flow of liquid circulating in the first loop, the second loop incorporates the second regulating component regulating the flow of liquid circulating in the second loop, the third loop incorporates the third regulating component regulating the flow of liquid circulating in the third loop, and the single actuator controls the three components regulating the flow of liquid circulating in said at least three recirculation loops.

3. The cooling circuit according to claim 1, wherein the first loop and the second loop incorporate a common component regulating the flow of liquid circulating in each of said first loop and second loop, the third loop incorporates a second component regulating the flow of liquid circulating in the third loop, and the single actuator controls the common component and the second component regulating the flow of liquid circulating in said at least three recirculation loops.

4. The cooling circuit according to claim 1, wherein regulation provided by the single actuator gives rise, to three distinct phases of associated regulation and circulation in said at least three recirculation loops, namely:

a first phase in which a value of a flow rate of the liquid in the first loop is progressively increased from a nil value to a maximum value, and a flow rate of liquid in the second and third loops is nil, a second phase in which a value of a flow rate of liquid in the first loop is, and remains, maximum, a value of a flow rate of liquid in the second loop is increased progressively from a nil value to a maximum value and a flow rate of liquid in the third loop is nil, and a third phase in which a value of a flow rate of liquid in the first loop remains maximum, a value of the flow rate of liquid in the second loop is progressively decreased to a nil value and a value of the flow rate of liquid in the third loop goes progressively from a nil value to a maximum value, starts of the second and third phases corresponding respectively to a maximum value being reached, in the first circulation loop and in the second circulation loop, for the flow rate of the liquid.

5. The cooling circuit according to claim 2, wherein the single actuator controls rotation of an actuating shaft connected functionally or operationally to the three regulating components.

6. The cooling circuit according to claim 5, wherein the first and second regulating components are mounted directly on said actuating shaft and the third regulating component is actuated by an intermediate actuating means connected kinematically to said actuating shaft.

7. The cooling circuit according to claim 1, wherein at least one primary fan convector or a similar heat exchanger is mounted in series in the first recirculation loop, the second recirculation loop comprises a branch loop, and at least one secondary fan convector, different from the primary fan convector in the first loop, including a radiator, is mounted in series in the third recirculation loop.

8. The cooling circuit according to claim 1, wherein the first regulating component is made in the form of a portion of a cylindrical wall mounted firmly so that it rotates on the actuating shaft, in a hollow housing, said hollow housing forming a port taking liquid to the first pipeline,
said portion of cylindrical wall being rotatably mounted transversely in said port, and its dimension being at least sufficient to block off the port in a closed position, and
walls of the hollow housing located on either side of the actuating shaft, perpendicular to the longitudinal axis of the port, offering a recess receiving the portion of cylindrical wall in a retracted position in which said portion of cylindrical wall is located outside a section of passage of the port,
so that the portion of cylindrical wall goes from a closed position to an open position during a first phase then remains in the open position during second and third phases, the open position corresponding to the retracted position.

9. The cooling circuit according to claim 1, wherein the second regulating component is made in the form of a portion of cylindrical wall mounted firmly so that it rotates on the actuating shaft, in a hollow housing, said hollow housing forming a port taking the liquid to the second pipeline,
said portion of cylindrical wall being rotatably mounted transversely in said port, and its dimensions being at least sufficient to block off the port in a closed position, and
walls of the hollow housing located on either side of the actuating shaft, perpendicular to the longitudinal axis of the port, offering a recess receiving the portion of cylindrical wall in a retracted position in which said portion of cylindrical wall is located outside a flow section of the port,
so that the portion of cylindrical wall is in a closed position during a first phase then moves from this closed position to an open position during a second phase and returns to the closed position during a third phase, the open position corresponding to the retracted position.

10. The cooling circuit according to claim 1, wherein the device for transmission and transformation of the rotating movement of the actuating shaft comprises a cam mounted to rotate on the actuating shaft and made in the form of a portion of disk offering a running surface for a roller fixed so that it rotates on a first extremity of a rod forming a cam follower, the other end of which offers a receiving groove, perpendicular to a longitudinal axis of the third pipeline, to receive a first extremity of a bar, the other end of which is connected to a swivel pin of the valve, said rod being guided parallel to the longitudinal axis of the third pipeline in a corresponding groove made in a projecting part of the structural unit so that rotation of the cam causes movement of the roller along the running surface of said cam, movement of the rod parallel to the longitudinal axis of the third pipeline, movement of the first extremity of the bar in the receiving groove, perpendicular to the longitudinal axis of the third pipeline, and pivoting of the valve around its axis to open or close the passage of the pipeline.

11. The cooling circuit according to claim 10, further including a safety means directly influenced by a temperature of liquid circulating in the structural unit and forcing opening of the third component regulating the liquid circulating in the third recirculation loop.

12. The cooling circuit according to claim 11, wherein a compression spring forming safety means is composed of two metals.

13. The cooling circuit according to claim 1, wherein an intake of the recirculating pump is connected to outlets of the at least three recirculation loops, an outlet of said pump is connected to inlets of the at least three recirculation loops, and the common fluid node is located close to, and connected to, the outlets of the at least three recirculation loops.

* * * * *